(12) United States Patent
Plachetka (10) Patent No.: US 12,235,249 B2
(45) Date of Patent: Feb. 25, 2025

(54) REMOVING PORTIONS OF UNDEFINED COMPOSITION FROM THE MOBILE PHASE

(71) Applicant: Agilent Technologies, Inc., Santa Clara, CA (US)

(72) Inventor: Clemens Plachetka, Malsch (DE)

(73) Assignee: Agilent Technologies, Inc., Santa Clara, CA (US)

( * ) Notice: Subject to any disclaimer, the term of this patent is extended or adjusted under 35 U.S.C. 154(b) by 681 days.

(21) Appl. No.: 17/297,908

(22) PCT Filed: Nov. 27, 2018

(86) PCT No.: PCT/IB2018/059350
§ 371 (c)(1),
(2) Date: May 27, 2021

(87) PCT Pub. No.: WO2020/109838
PCT Pub. Date: Jun. 4, 2020

(65) Prior Publication Data
US 2022/0018815 A1 Jan. 20, 2022

(51) Int. Cl.
*G01N 30/34* (2006.01)

(52) U.S. Cl.
CPC .................. *G01N 30/34* (2013.01)

(58) Field of Classification Search
CPC ............... G05D 11/035; F04B 11/0058; F04B 11/0083; F04B 13/02; F04B 2205/09; F04B 23/04; F04B 49/065; F04B 53/06; B01L 2200/0673; B01L 2400/0487; B01L 2400/0644; B01L 3/502784; B01F 2101/2204; B01F 35/883; B01D 15/14; B01D 15/12; B01D 15/166; G01N 30/34;
(Continued)

(56) References Cited

U.S. PATENT DOCUMENTS

| 6,428,702 B1 * | 8/2002 | Berger | B01D 15/14 422/69 |
| 10,060,886 B2 * | 8/2018 | Jackson | F04B 49/065 |

(Continued)

FOREIGN PATENT DOCUMENTS

| CN | 1510418 A | 7/2004 |
| CN | 202693596 U | 1/2013 |

(Continued)

OTHER PUBLICATIONS

International Search Report and Written Opinion mailed on Oct. 30, 2019 for Application No. PCT/IB2018/059350; 15 pages.

(Continued)

*Primary Examiner* — Kristina M Deherrera
*Assistant Examiner* — Gedeon M Kidanu (57) ABSTRACT

A fluid supply system, for supplying a mobile phase in a sample separation device for separating a fluidic sample in a separation path, includes a proportioning unit for proportioning multiple solvent components for composing the mobile phase, a fluid drive unit for driving the solvent components of the mobile phase, and a control unit for controlling the proportioning unit and the fluid drive unit so that an undefined portion of the mobile phase is removed from the mobile phase before delivering the mobile phase from the fluid drive unit to the separation path.

20 Claims, 4 Drawing Sheets

(58) Field of Classification Search
CPC ....... G01N 2030/121; G01N 2030/326; G01N 2030/8411; G01N 30/16; G01N 30/461; G01N 30/462

See application file for complete search history.

(56) References Cited

U.S. PATENT DOCUMENTS

| | | | |
|---|---|---|---|
| 2004/0124128 A1* | 7/2004 | Iwata | G01N 30/462 210/198.2 |
| 2005/0023205 A1* | 2/2005 | Hiraku | F04B 11/0058 210/258 |
| 2005/0095145 A1 | 5/2005 | Hiraku et al. | |
| 2007/0144977 A1* | 6/2007 | Kitagawa | G05D 11/035 204/450 |
| 2015/0059451 A1* | 3/2015 | Witt | G01N 30/34 252/364 |
| 2015/0316455 A1 | 11/2015 | Anderer et al. | |
| 2017/0343520 A1* | 11/2017 | Ortmann | G01N 30/04 |
| 2023/0112993 A1* | 4/2023 | Stoll | G01N 30/24 73/61.55 |

FOREIGN PATENT DOCUMENTS

| | | |
|---|---|---|
| CN | 103814292 A | 5/2014 |
| EP | 1577012 A1 | 9/2005 |
| JP | 2003014718 A | 1/2003 |
| JP | 2014038113 A | 2/2014 |
| WO | 2011085353 A1 | 7/2011 |
| WO | 2013159816 A1 | 10/2013 |

OTHER PUBLICATIONS

Chinese Office Action and Search Report dated Jul. 28, 2023 for Application No. 201880099742.0; 10 pages.

* cited by examiner

REMOVING PORTIONS OF UNDEFINED COMPOSITION FROM THE MOBILE PHASE

RELATED APPLICATIONS

This application is the national stage under 35 U.S.C. 371 of International Application No. PCT/IB2018/059350, filed Nov. 27, 2018, the entire contents of which are incorporated by reference herein.

BACKGROUND ART

The present invention relates to a fluid supply system, a sample separation device, and a method of supplying a mobile phase in a sample separation device for separating a fluidic sample in a separation path.

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. This usually occurs in the presence of a significantly smaller pressure than what the separation unit is run with. Thereafter, an injector valve is switched so as to introduce the intaken amount of fluidic sample from the sample loop of a metering path into the separation path between fluid drive unit and the separation unit for subsequent separation.

However, the provision of a mobile phase with precisely defined composition is still difficult.

SUMMARY

It is an object of the invention to provide a mobile phase for a sample separation system with a precisely defined composition.

According to an exemplary embodiment of the present invention, a fluid supply system for supplying a mobile phase in a sample separation device for separating a fluidic sample in a separation path is provided, wherein the fluid supply system comprises a proportioning unit configured for proportioning multiple solvent components for composing the mobile phase, a fluid drive unit configured for driving the solvent components of the mobile phase, and a control unit configured for controlling the proportioning unit and the fluid drive unit so that an undefined portion of the mobile phase is removed from the mobile phase before delivering the mobile phase from the fluid drive unit to the separation path.

According to another exemplary embodiment, a sample separation device for separating a fluidic sample in a separation path is provided, wherein the sample separation device comprises a fluid supply system having the above-mentioned features for supplying mobile phase and for driving the mobile phase and the fluidic sample injected in the mobile phase along the separation path, and a sample separation unit configured for separating the fluidic sample in the mobile phase.

According to still another exemplary embodiment, a method of supplying a mobile phase in a sample separation device for separating a fluidic sample in a separation path is provided, wherein the method comprises proportioning multiple solvent components for composing the mobile phase, driving the solvent components of the mobile phase towards the separation path, and controlling the proportioning and the driving so that an undefined portion of the mobile phase is removed from the mobile phase before injecting the fluidic sample in the mobile phase for separation in the separation path.

In the context of the present application, the term "undefined portion of mobile phase" may particularly denote a defined or identified spatial section of mobile phase, composed of multiple solvent components and flowing serially through a conduit or flow path of a sample separation device, which spatial section—unlike other spatial sections of the created mobile phase—does not have well-defined or well-known properties (in particular does not have a well-known or well-defined composition of the solvent components) due to uncontrollable phenomena in the fluid supply system. Due to such known phenomena or artefacts, which may occur during mobile phase creation in the fluid supply system, there may be an undesired impact on the spatial accuracy of specifically the undefined portion of the mobile phase. One example of such undefined portions of mobile phase are fluid interfaces between different fluid packets of different solvent components directly adjacent to one another in a conduit or flow path, where not properly predictable diffusion artefacts or the like may occur and may locally create a portion of undefined mobile phase. Another example is historical fluid remaining in the piston chamber of the fluid drive unit and being not properly forwarded to the separation path after compression of the mobile phase in the piston chamber. By modeling or determining one or more such artefacts, one or more suspicious undefined sections of the mobile phase, for which poor knowledge concerning their exact composition is available, may be identified, and the resulting undefined mobile phase section may be removed, for instance drained.

According to an exemplary embodiment of the invention, the accuracy, precision and reproducibility of forming a solvent composition as a mobile phase for a sample separation device may be significantly improved compared to conventional approaches. For instance, such a mobile phase may be mixed by controlling a proportioning unit to provide a serial sequence of fluid packets of different solvent components which together form the mobile phase. The provided solvent components may be driven through a fluid supply system by a fluid drive unit before being introduced into a separation path in which a fluidic sample injected into the mobile phase is separated into fractions. During the described procedure of composing the mobile phase from a plurality of different solvent components with a desired composition (for instance X % water and (100–X) % of an organic solvent, such as methanol), various artefacts may occur which may generate one or more undefined portions (such as one or more undefined spatial sections) of the mobile phase being presently formed based on the plurality of solvent components. For instance, an interface between adjacent fluidic packets of the solvent components may be a source of uncertainty and lack of defined properties, since effects such as diffusion or the like may result in a certain degree of mixing between the adjacent fluid packets in an undefined or unpredictable way. As another example, a portion of the mobile phase being proportioned by the proportioning unit and being subsequently driven into the separation path by the fluid drive unit may remain in the fluid drive unit (for instance in a piston chamber) without being forwarded into the separation path. For instance, such a situation may occur when the fluid drive unit comprises two serially arranged piston pumps, wherein solvent components provided from the proportioning unit are intaken and compressed by a primary one of the piston pumps. When the intaken and compressed sample is then forwarded to a secondary one of the piston pumps downstream of the primary piston pump, it may happen that a portion of the mobile phase remains in the primary piston pump without being moved towards the separation path. When such a portion of the mobile phase remains in the primary piston pump after compression and is not forwarded properly to the secondary piston pump, the exact composition of such a portion of mobile phase is unknown or undefined. According to an exemplary embodiment of the invention, an undesired impact of the described and other phenomena on the accuracy of the composition of the mobile phase—which translates into a reduction of the separation accuracy of the sample separation device—can be suppressed by removing such one or more identified undefined portions of the mobile phase before forwarding such one or more undefined portions to the separation path. Such a defined removal of an undefined portion from the mobile phase may be carried out by separating the undefined portion from a defined portion of the mobile phase, and only the defined portion of the mobile phase may then be forwarded towards the separation path. The undefined portion, however, may not be forwarded into the separation path, but may be selectively removed beforehand (for instance is guided into another conduit, such as a waste conduit, and thereby away from the well-defined portion of the mobile phase). By such a selective removal of one or more undefined portions from a mobile phase, solvent composition accuracy and separation precision may therefore be improved.

In the following, further embodiments of the fluid supply system, the sample separation device, and the method will be explained.

In an embodiment, the proportioning unit is configured for providing a serial sequence of fluid packets each relating to a respective one of the solvent components. For instance, the proportioning unit may first provide a first fluid packet of a first solvent component (for instance water), followed by a second fluid packet of a second solvent component (for instance methanol or acetonitrile). Thereafter, it is possible that a third fluid packet of the first solvent component is supplied, or alternatively a third fluid packet of another third solvent component, and so on. As a result, a serial sequence of fluid packets, each being formed of a respective solvent component, may propagate through a corresponding fluidic conduit. Mixture between these fluid packets may then be accomplished in the fluid drive unit, a separate mixer and/or the phenomenon of diffusion between subsequent fluid packets. By adjusting the spatial length of the individual fluid packets (and therefore adjusting their volume) by defining corresponding temporal proportioning intervals by the proportioning unit, the solvent composition can be precisely defined.

In an embodiment, the undefined portion—which may be removed from the mobile phase under control of the control unit—corresponds to a fluid interface between adjacent fluid packets of different solvent components. As mentioned above, an interface between adjacent fluid packets (for instance a transition between a water fluid packet and a methanol fluid packet) may be subject of diffusion, etc. As a result, different solvent components may mix at the interface between adjacent fluid packets. Such a locally confined mixed zone has therefore a fluidic composition which is not well-defined or properly known, since the related physical phenomena are difficult to model. Therefore, the control unit may control the fluid supply system to get rid of such an undefined interface portion and can, for example, remove such an undefined portion into a waste conduit.

In an embodiment, the proportioning unit comprises at least one proportioning valve being switchable by the control unit for providing a fluidic coupling between a respective one of a plurality of fluid supply conduits each assigned to a respective one of the solvent components and a fluidic conduit fluidically connecting the proportioning valve with the fluid drive unit. Each of the fluid supply conduits may, for example, be connected with a respective solvent container comprising the assigned solvent component (for instance a water container, a methanol container, etc.). Via a respective fluid supply conduit, each of these solvent containers may be connected to the proportioning valve, i.e. a fluidic valve being switchable between different fluidic coupling states. By switching the proportioning valve under control of the control unit, the length and type of the respective fluid packets being forwarded into the fluidic conduit and forming part of the mobile phase to be created can be precisely defined. For instance, the proportioning valve may comprise four inlets or ports being connected to four fluid supply conduits and may have only one outlet or port connected to a fluidic conduit guiding the mobile phase towards the fluid drive unit. Such a proportioning valve may be denoted as a quaternary valve which allows for a mixture of up to four solvent components. The provision of a mobile phase composed of multiple different solvent components may be advantageous for a sample separation device such as a liquid chromatography apparatus, for instance for running a gradient run in which the relative contributions of different solvent components is varied over time in terms of a chromatographic separation analysis. Alternatively, the composition of the mobile phase may remain constant over time, for instance in an isocratic mode of a chromatographic sample separation device.

In an embodiment, the fluid supply system comprises a pre-pump in at least one of the plurality of fluid supply conduits. Advantageously, an active pre-pump may be provided in a respective one of the fluid supply conduits. In such an embodiment, the pre-pump may actively drive the respective solvent component towards the proportioning unit. When such pre-pumps are not provided, the fluid drive unit alone may drive the mobile phase or its solvent components. For instance, the respective pre-pump may be a peristaltic pump, a piston pump, etc.

In an embodiment, the fluid drive unit comprises a primary piston pump for aspirating and compressing the mobile phase and a secondary piston pump downstream of and cooperating with the primary piston pump and being configured for driving the compressed mobile phase into the separation path. In such an embodiment, the primary piston pump may intake or aspirate the mobile phase provided via the proportioning unit by moving its piston in a backward direction. As a result, the mobile phase is sucked into a piston chamber of the primary piston pump. Thereafter, the primary piston pump may move its piston in a forward direction to thereby compress the intaken mobile phase. The aspirated and compressed mobile phase can be transferred from the primary piston pump into the secondary piston pump by a coordinated forward motion of the piston of the primary piston pump and a corresponding backward motion of the piston of the secondary piston pump. The secondary piston pump may then drive or pump the compressed mobile phase into the separation path while the primary piston pump may already prepare for a subsequent intake and compression cycle. Such a double piston pump configuration of a fluid drive unit has turned out as highly efficient for providing highly pressurized mobile phase.

In an embodiment, the undefined portion—which may be removed from the mobile phase under control of the control unit—corresponds to an amount, portion or volume of mobile phase remaining in the primary piston pump after having supplied another amount, portion or volume of mobile phase compressed by the primary piston pump from the primary piston pump to the secondary piston pump. Thus, the transfer of the aspirated and compressed mobile phase from the primary piston pump to the secondary piston pump may result in a portion of the mobile phase remaining in the piston chamber of the primary piston pump without being transferred to the secondary piston pump. This means that a subsequent aspirating cycle would start with some historic mobile phase of not precisely defined composition remaining undesirably in the primary piston pump. In order to get rid of such an undefined portion of the mobile phase, it is possible according to an exemplary embodiment that the remaining amount of mobile phase is first ejected from the primary piston pump and can be guided, for instance, towards a waste conduit and then into a waste container. By taking this measure, it can be ensured that the entire mobile phase transferred from the fluid supply system into the separation path is of precisely controlled and well-defined composition.

In an embodiment, the primary piston pump of the fluid drive unit is controllable by the control unit for moving its piston in a forward direction to thereby remove the undefined portion to a waste conduit. For instance, removing the undefined portion in the described scenario may be accomplished by moving the piston of the primary piston pump, after transferring mobile phase to the secondary piston pump, firstly in a backward direction and subsequently in a forward direction, thereby ejecting the undefined remaining portion of the mobile phase in the piston chamber of the primary piston pump away from the separation path, for instance into the waste conduit.

In an embodiment, the fluid supply system comprises a buffer unit, in particular a buffer loop, with a predefined volume for temporarily accommodating the undefined portion before removing it out of the fluid supply system. For instance, the buffer unit may include a central volume portion between two peripheral volume portions and may be configured for accommodating the undefined portion in the central volume portion while accommodating mobile phase or a solvent component of the mobile phase with defined properties in at least one of the peripheral volume portions. Hence, a buffer unit with a predefined volume for accommodating mobile phase may be provided in which the undefined portion may be securely temporarily accommodated or stored before removing it. More specifically, the buffer unit may be configured in such a way that its central volume portion is properly filled with the undefined portion while the upstream and downstream peripheral portions directly connecting to the central volume portion may be filled with mobile phase or a mobile phase component of defined origin or characteristics. For example, such a buffer unit may be configured as a buffer loop, i.e. a looped conduit with a sufficiently large volume to reliably accommodate the entire undefined portion of mobile phase. It can then be ensured that subsequently the undefined portion is ejected towards waste and is thereby removed from the mobile phase before the mobile phase with defined properties is forwarded into the separation path.

In an embodiment, the buffer unit is located downstream of the proportioning unit and upstream of the fluid drive unit. Such embodiments are shown for instance in FIG. 3A and FIG. 3B. For instance, an undefined portion in a piston chamber of a primary piston pump may be transferred into such a buffer unit by a simple additional forward motion of the piston of the primary piston pump.

In an embodiment, the buffer unit is located downstream of a primary piston pump of the fluid drive unit and upstream of a secondary piston pump of the fluid drive unit located downstream of the primary piston pump. Corresponding embodiments are shown for instance in FIG. 4 to FIG. 9. Advantageously, the spatial distance between the primary piston pump and the buffer unit may be very small in such an embodiment.

In an embodiment, the fluid supply system comprises a waste conduit branching off from a fluidic conduit between the proportioning unit and the fluid drive unit and being configured for receiving the undefined portion to be removed from the mobile phase. However, the waste conduit may also be positioned elsewhere. Again referring to the previously described embodiment, the waste conduit branching off from the fluidic conduit may form, together with the fluidic conduit, a fluidic Y-piece, a fluidic T-piece, a fluidic X-piece, etc. In a mobile phase creation mode, the mobile phase may move forwardly along the fluidic conduit preferably without branching off into the waste conduit (this may be controlled by one or more valves). However, when an undefined portion of the mobile phase shall be removed, such an undefined portion may be branched off selectively into the waste conduit so as to be separated from the rest of the mobile phase to avoid that the undefined portion is forwarded into the separation path. This flow characteristic or control may be obtained by providing one or more valves (such as check valves in the fluidic conduit and/or the waste conduit accomplishing this flow logic, in particular under control of the control unit).

In an embodiment, the fluid supply system comprises an active valve between the waste conduit and the fluid drive unit and being switchable by the control unit for removing the undefined portion from the mobile phase. Such an active valve may denote a valve which can be actively controlled by the control unit rather than operating merely passively as a result of pressure differences between two fluidic connections of the valve. The mentioned active valve can hence be switched so that the undefined portion is removed and is moved towards the waste conduit.

In an embodiment, the fluid supply system comprises a check valve in the waste conduit configured to open for removing the undefined portion into the waste conduit. Such a check valve may be an active valve or a passive valve. For instance, it may be a passive valve which opens when a pressure applied by the fluid drive unit (in particular by a primary piston pump) presses an undefined portion through the fluidic conduit and up to the waste conduit. In the presence of such a pressure which may be ensured by a corresponding operation of the primary piston pump controlled by the control unit, a corresponding passive check valve may open and may automatically remove the undefined portion from the rest of the mobile phase. It is however also possible that the check valve is an active valve which is controlled, by the control unit, to open when an undefined portion is to be ejected into the waste conduit for removing it from a defined rest of the mobile phase.

In an embodiment, the removed undefined portion may correspond to a fluid interface between adjacent fluid packets of different solvent components of the mobile phase. Additionally or alternatively, the removed undefined portion may correspond to a portion of mobile phase which has been compressed but not delivered towards the separation path. However, also other undefined portions of mobile phase occurring in a sample separation device may be selectively removed for improving accuracy of the composition of the mobile phase.

In an embodiment, the fluid drive unit is configured for compressing the mobile phase, in particular up to a pressure of at least 500 bar, more particularly of at least 1500 bar, even more particularly of at least 1200 bar. Hence, the fluid drive unit may be capable of operating as a high pressure pump, in particular for high pressure liquid chromatography applications.

In an embodiment, an injector (which may be located downstream of the fluid drive unit and may define a downstream end of the separation path) for injecting the fluidic sample to be separated into the defined mobile phase provided by the fluid supply system comprises a needle and a seat configured for accommodating the needle. The needle may be drivable towards a sample container for intaking fluidic sample into a sample accommodation volume by a corresponding operation of a metering pump or other type of sample drive. The needle may be configured to be drivable to the seat prior to injection. In such a configuration, the fluidic sample may be stored in the sample container (such as a vial). The needle may be driven out of the seat, for instance by a robot, and may be immersed into the fluidic sample in the sample container. Subsequently, a piston of the sample drive (such as a metering pump) may be driven in a backward direction to thereby intake a certain amount of fluidic sample from the sample container via the needle into the sample accommodation volume. Thereafter, the needle may be driven back into the seat to establish a fluid-tight connection there. By switching a fluidic valve of the injector into an injection switching state, the intaken fluidic sample may be injected from the sample accommodation volume into the mobile phase provided by the fluid supply system, so that the fluidic sample and the mobile phase may be driven towards the separation unit.

In an embodiment, the sample drive or metering device of the injector comprises a piston configured for moving in opposite directions when intaking fluidic sample (which may involve a backward motion of the piston) and when injecting fluidic sample into the separation path pressing the fluidic sample towards the separation unit in the injection switching state. The piston may be mounted for reciprocating in a piston chamber of the sample drive. For drawing or intaking fluidic sample into the sample accommodation volume, the piston may be moved backwardly so as to draw fluidic sample from a sample container through a needle into the sample accommodation volume.

Embodiments of the above described fluidic valve may be implemented in conventionally available HPLC systems, such as the Agilent 1200 Series Rapid Resolution LC system or the Agilent 1150 HPLC series (both provided by the applicant Agilent Technologies—see the website www.agilent.com.

One embodiment of a sample separation device comprises a pumping apparatus as fluid drive unit having a pump piston for reciprocation in a pump working chamber to compress liquid in the pump working chamber to a high pressure at which compressibility of the liquid becomes noticeable. This pumping apparatus may be configured to know (by means of operator's input, notification from another module of the instrument or similar) or elsewise derive solvent properties.

The separation unit of the sample separation device preferably comprises a chromatographic column (see for instance the webpage en.widipedia.org/wiki/Column_chromatography providing a stationary phase. The column may be a glass or steel tube (for instance with a diameter from 50 µm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to minimize the retention of the compounds of interest and/or the amount of mobile phase to run the chromatography. The mobile phase can also be chosen so that the different compounds or fractions of the fluidic sample can be separated effectively. The mobile phase may comprise an organic solvent like for instance methanol or acetonitrile, often diluted with water. For gradient operation water and organic solvent are delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

The fluidic sample may comprise but is not limited to any type of process liquid, natural sample like juice, body fluids like plasma or it may be the result of a reaction like from a fermentation broth.

The pressure, as generated by the fluid drive unit, in the mobile phase may range from 2-200 MPa (20 to 2000 bar), in particular 10-150 MPa (150 to 1500 bar), and more particularly 50-120 MPa (500 to 1200 bar).

The sample separation device, for instance an HPLC system, may further comprise a detector for detecting separated compounds of the fluidic sample, a fractionating unit for outputting separated compounds of the fluidic sample, or any combination thereof. Further details of such an HPLC system are disclosed with respect to the Agilent 1200 Series Rapid Resolution LC system or the Agilent 1150 HPLC series, both provided by the applicant Agilent Technologies, under the website www.agilent.com.

Embodiments of the invention can be partly or entirely embodied or supported by one or more suitable software programs (or software), which can be stored on or otherwise provided by any kind of non-transitory medium or data carrier, and which might be executed in or by any suitable data processing unit such as an electronic processor-based computing device (or system controller, control unit, etc.) that includes one or more electronic processors and memories. Software programs or routines e.g., computer-executable or machine-executable instructions or code) can be preferably applied in or by the control unit. For example, one embodiment of the present disclosure provides a non-transitory computer-readable medium that includes instructions stored thereon, such that when executed on a processor, the instructions perform the steps of the method of any of the embodiments disclosed herein.

BRIEF DESCRIPTION OF DRAWINGS

Other objects and many of the attendant advantages of embodiments of the present invention will be readily appreciated and become better understood by reference to the following more detailed description of embodiments in connection with the accompanying drawings. Features that are substantially or functionally equal or similar will be referred to by the same reference signs.

The illustration in the drawing is schematic.

DETAILED DESCRIPTION

Before describing the figures in further detail, some basic considerations of the present invention will be summarized based on which exemplary embodiments have been developed.

According to an exemplary embodiment of the invention, an architecture for forming a mobile phase to be introduced into a separation path of a sample separation device is provided. More specifically, gradient creation for an HPLC may be refined or rendered more accurate using a selective intake method.

When creating a solvent gradient (or any other kind of mobile phase) in an HPLC (or another sample separation device), a switch valve of a proportioning unit in conjunction with a double piston pump of a fluid drive unit may be used. A piston of a primary piston pump of such a fluid drive unit may do the intake from a valve side (i.e. the side of the proportioning unit) or solvent bottle side, wherein a piston of a secondary piston pump of the fluid drive unit delivers its content to the separation path (in particular to a chromatographic separation column or any other type of sample separation unit). When the primary piston pump has finished its delivery phase, the secondary piston pump takes over and delivers its content to the separation path. Then, reloading of the piston pump may occur. When the primary piston pump starts the intake from the bottle side again, a new cycle begins.

However, in such a conventional fluid supply system, issues with gas in solvent may occur. A shortcoming during this operation is that the primary piston pump needs to suck the solvent components in. Consequently, air bubbles or gas bubbles may become relevant and may get a direct influence on the composition precision. Gas in a channel from the solvent bottles may reduce the stiffness of the solvent which is being sucked in. When the primary piston carries out the intake movement, the fluid is stiff in good approximation whereas the gaseous amount of intake is quite elastic which leads to too little intake of fluid and unwanted oscillations.

Furthermore, an improper closing and/or opening of the fluid valve(s), in particular of the proportioning unit and/or of the fluid drive unit may occur. Thus, another conventional shortcoming may be artefacts caused by the opening and closing of valves which affects accuracy and precision of the solvent composition. Due to hydromechanical shortcomings, a precise time to open or close a valve until it is hydraulically sealed or fully open cannot, under undesired circumstances, be guaranteed by a fraction of a millisecond. Furthermore, effects of material aging and plasticization may become relevant when requiring a highly precise and accurate composition. Specifications on such a valve may be very demanding. However, it may be advantageous to select either the intake movement long enough so that the proper actuating of the valves can be ensured, or another selective intake method may be used to suppress or even eliminate composition errors in the intake fluid path, directly after their unwanted creation. Doing so may allow high flow rates at small or even minimum composition error.

Apart from this, an unknown exact point of decompression and backpressure may become an issue. Solvent delivery of the primary piston may be directly followed by an intake. The intake starts when the pressure within the primary piston equals the pressure at the inlet plus unknown backpressure of an active inlet valve due to mechanical stiffnesses. The active inlet valve can be automatically opened and is being passively closed.

As will be described below, exemplary embodiments of the invention may overcome at least part of the mentioned and/or other shortcomings of conventional fluid supply systems.

Figure 1:
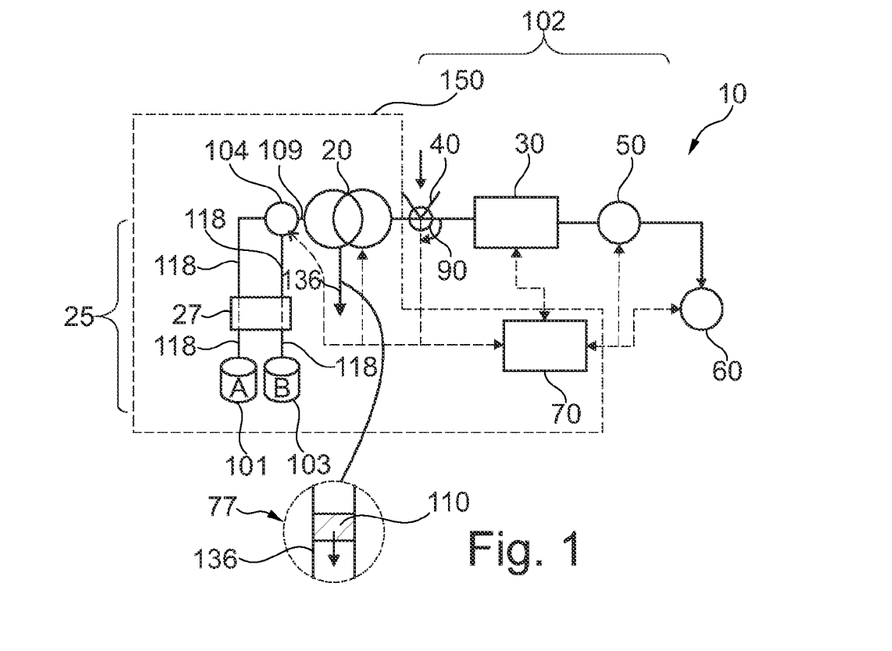
FIG. 1 shows a liquid sample separation device in accordance with embodiments of the present invention, particularly used in high performance liquid chromatography (HPLC).

Referring now in greater detail to the drawings, FIG. 1 depicts a general schematic of a liquid separation system as example for a sample separation device 10 according to an exemplary embodiment of the invention. A pump as fluid drive unit 20 receives a mobile phase from a solvent supply 25, typically via a degasser 27, which degases and thus reduces the amount of dissolved gases in the mobile phase. The mobile phase drive or fluid drive unit 20 drives the mobile phase through a separation unit 30 (such as a chromatographic column) comprising a stationary phase. A sampler or injector 40, implementing a fluidic valve 90, can be provided between the fluid drive unit 20 and the separation unit 30 in order to subject or add (often referred to as sample introduction) a sample fluid into the mobile phase so that a mixture of fluidic sample and mobile phase may be provided towards a separation path 102 where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid.

While the mobile phase can be comprised of one solvent only, it may also be mixed from plural solvents. Such mixing might be a low pressure mixing and provided upstream of the fluid drive unit 20, so that the fluid drive unit 20 already receives and pumps the mixed solvents as the mobile phase. Alternatively, the fluid drive unit 20 might be comprised of plural individual pumping units, with plural of the pumping units each receiving and pumping a different solvent or mixture, so that the mixing of the mobile phase (as received by the separation unit 30) occurs at high pressure and downstream of the fluid drive unit 20 (or as part thereof). The composition (mixture) of the mobile phase may be kept constant over time, the so called isocratic mode, or varied over time, the so called gradient mode.

A data processing unit or control unit 70, which can be a PC or workstation, may be coupled (as indicated by the dotted arrows) to one or more of the devices in the sample separation device 10 in order to receive information and/or control operation. For example, the control unit 70 may control operation of the fluid drive unit 20 (for example setting control parameters) and receive therefrom information regarding the actual working conditions (such as output pressure, etc. at an outlet of the pump 20). The control unit 70 may also control operation of the solvent supply 25 (for example setting the solvent/s or solvent mixture to be supplied) and/or the degasser 27 (for example setting control parameters such as vacuum level) and might receive therefrom information regarding the actual working conditions (such as solvent composition supplied over time, vacuum level, etc.). The control unit 70 might further control operation of the sampling unit or injector 40 (for example controlling sample injection or synchronization sample injection with operating conditions of the fluid drive unit 20). The separation unit 30 may also be controlled by the control unit 70 (for example selecting a specific flow path or column, setting operation temperature, etc.), and send-in return-information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detectors 50) and provide data back.

FIG. 1 also shows a liquid supply device 150 configured for metering liquids in controlled proportions and for supplying a resultant mixture as mobile phase. The liquid supply device 150 comprises in the shown example two reservoirs 101, 103 each containing a respective solvent component A (in this example water), B (in this example a buffer, i.e. salt dissolved in a solvent). Moreover, it is possible to provide one or more additional reservoirs, for instance an additional reservoir comprising an organic solvent, a further reservoir comprising an optional organic modifier, etc. Each of the reservoirs 101, 103 is fluidically connected via a respective liquid supply line 118 with a proportioning unit 104 which may be configured as proportioning valve. The proportioning unit 104 is configured to connect a selected one of the liquid supply lines 118 with a supply line 109 guiding towards the fluid drive unit 20, and to switch between different liquid supply lines 118. The supply line 109 is connected with an inlet of the fluid drive unit 20. Hence, solvent blending is performed at the low-pressure side of the fluid drive unit 20 by metering or proportioning a sequence of fluidic portions.

In the fluid supply system 150, the proportioning unit 104 is hence configured for proportioning multiple solvent components A, B for composing the mobile phase. The fluid drive unit 20 is here configured for driving the solvent components A, B of the mobile phase along the fluidic conduits and through the fluidic members shown in FIG. 1. Advantageously, the control unit 70 may be configured for controlling operation of the proportioning unit 104 and the fluid drive unit 20 so that one or more undefined portions 110 of the mobile phase is or are removed from the mobile phase before delivering the mobile phase from the fluid drive unit 20 to the separation path 102. This is illustrated schematically in FIG. 1 by a waste conduit 136 branching off from the fluid drive unit 20 for removing a specific undefined portion 110 of mobile phase before the mobile phase is delivered to the separation path 102. A detail 77 of FIG. 1 illustrates how this undefined portion 110 of mobile phase is removed via waste conduit 136. Examples of configurations enabling such a removal of undefined portions 110 of the mobile phase will be described below referring to FIG. 3A to FIG. 9. As a result, the composition of the mobile phase entering the separation path 102 is well-defined, so that the accuracy of the separation result may be high.

Figure 2:
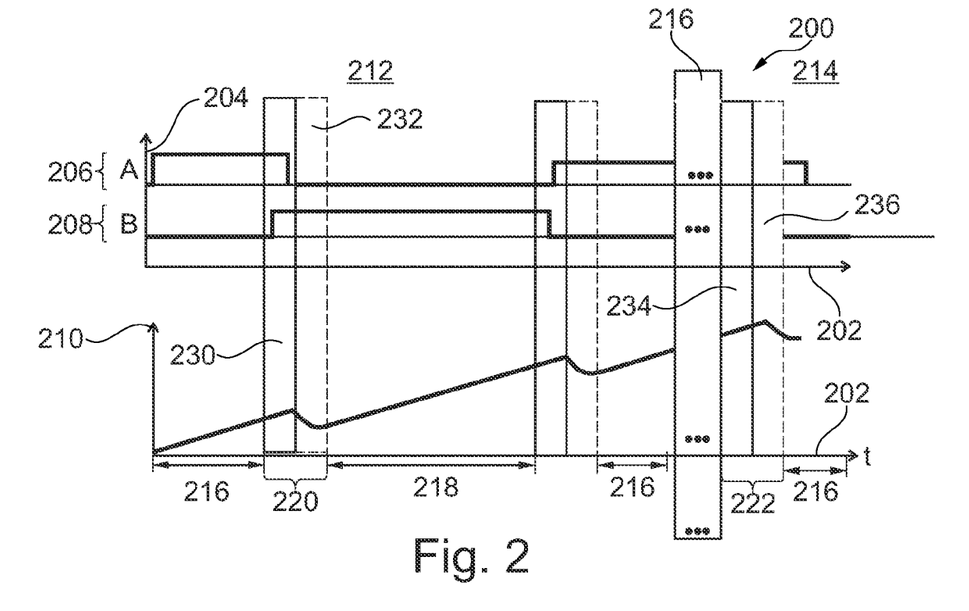
FIG. 2 is a diagram illustrating artefacts which may occur in terms of mobile phase composition, and how such artefacts may be suppressed or even eliminated according to exemplary embodiments of the invention.

The selective intake method described in the following in further detail directly addresses shortcomings which have been described prior to the description of FIG. 1. Assuming an intake is per se undefined when the solvent is switched, for example from a channel relating to solvent component A to another channel relating to solvent component B, it may be advantageous to eliminate a corresponding fluid segment or undefined portion 110 by default. FIG. 2 illustrates a corresponding principle, which may be implemented according to an exemplary embodiment of the invention.

FIG. 2 is a diagram 200 illustrating artefacts which may occur in terms of mobile phase composition, and how they may be overcome according to an exemplary embodiment of the invention. The diagram 200 has an abscissa 202 along which the time, t, is plotted. Along a first ordinate 204, events occurring in a primary channel relating to solvent component A (see reference numeral 206) and in a secondary channel B (see reference numeral 208) are plotted. Along a second ordinate 210, the position of a piston of a primary piston pump (see reference numeral 124 in FIG. 3A to FIG. 9) of fluid drive unit 20 is plotted.

More specifically, FIG. 2 illustrates an intake scheme showing how artefacts or portions of undefined composition in a mobile phase can be prevented. FIG. 2 indicates a first intake stroke 212, a subsequent intake stroke 214, and a delivery phase 216 in between. A respective phase of drawing solvent component A is indicated with reference numeral 216, and a phase of drawing solvent component B is indicated with reference numeral 218. Reference numeral 220 illustrates a time interval during which an error in the composition of the mobile phase may occur, in particular caused by switching valves. An error caused by a point of decompression is indicated with reference numeral 222.

Fluid or solvent component A from a channel, supply line 118 or reservoir 101 may be taken in until fluid portion 230 is reached. Portion 230 depicts an extra intake or fluid portion of undefined composition which may be delivered to waste afterwards, symbolized by reference numeral 232. In this extra intake, the insecurities which are induced by switching from one valve to another are being placed into. Insecurities are for example the varying intake of fluid caused by gas and mechanical timings of valves. Knowledge of the exact timing and pumping volume may be not necessary any longer.

What concerns an error caused by switching valves (compare reference numeral 220), an undefinded composition may be obtained due to an unknown point of time when a valve relating to the supply of solvent component A is fully closed and a valve relating to the supply of solvent component B is sufficiently open. Hence, the compression of the fluid may be also unknown.

What concerns an error caused by a point of decompression (compare reference numeral 222), an undefined composition may be due to an unknown point of time when decompression in the primary piston pump 124 is finished and an intake begins. A corresponding "remove to waste conduit" procedure may normalize each intake from the beginning with the fluid from the primary channel.

A fluid supply system 150 according to an exemplary embodiment of the invention may implement the procedure as shown in FIG. 2, for increasing accuracy of solvent composition of mobile phase, which will be described in further detail in the following:

During intake, fluid may be taken in from the channel corresponding to solvent component A. An optional prepump (see reference numeral 122 in FIG. 3A, FIG. 3B) delivers the solvent into the system. For instance, a corresponding check valve (see reference numeral 180 in FIG. 3A, FIG. 3B) opens at 1 bar. The fluid is stretched (optionally with bubbles) by the primary piston pump 124. The exact amount of fluid is unknown, as the exact time is unknown when the previous channel has been closed and the subsequent one been opened. Also the stiffness of the air-liquid mixture may involve an uncertainty.

Intake of fluid relating to solvent component A may be finished when the piston position reaches a point of time corresponding to portion 230. This marks the target or desired amount, assuming a perfect intake. Portion 230 is the segment of the solvent composition of the mobile phase which may be dumped or removed.

When the piston reaches a point of time corresponding to reference numeral 232, it changes its direction to deliver, an active inlet valve (compare for instance reference numeral 138 in FIG. 3A, FIG. 3B) upstream of the primary piston pump may be kept open, check valves (compare for instance reference numeral 180 in FIG. 3A, FIG. 3B) at the bottles may close. When the system pressure reaches a predetermined threshold value (for example 2 bar), a check valve (compare for instance reference numeral 190 in FIG. 3A, FIG. 3B) in a waste conduit (compare for instance reference numeral 136 in FIG. 3A, FIG. 3B) may open. The undefined portions 110 or fluid packages may be sent to the waste conduit 136. A throttle may prevent degassing of the remaining fluid as it keeps the system pressure up.

When the piston reaches the end of the interval indicated with reference numeral 232, the exact amount of desired intake is in the system. As the pressure is above ambient pressure, the influx of gas can be neglected. As the undefined portion 110 or part of the solvent composition forming the mobile phase has been removed, mechanical issues influencing this segment can also be neglected.

Thereafter, fluid may be taken in from the next channel, supply line 118 or reservoir 103, for example from a channel relating to solvent component B.

Next, a first intake after the delivery phase, and decompressing, will be described.

The piston may decompress within portion 234. The exact amount of fluid, being drawn in, is unknown. The primary channel which ended the cycle also starts the new cycle. Hence, there are no switching errors of the bottle-side valves. The only remaining errors are the remnants of the previous cycle from the primary piston as well as the insecurity regarding the point of decompression. The above-described active inlet valve 138 may be now open. The insecurities may be due to the intake in portion 234.

Reaching a point of time corresponding to portion 236, the active inlet valve 138 may be still open. The piston changes from intake to delivery and sends the additional intake to the waste conduit 136.

At the beginning of drawing solvent component A according to reference numeral 216 of FIG. 2, the piston is in a defined condition.

Thereafter, the normal intake begins and starts with intake from the channel relating to solvent component A.

Figure 3A:
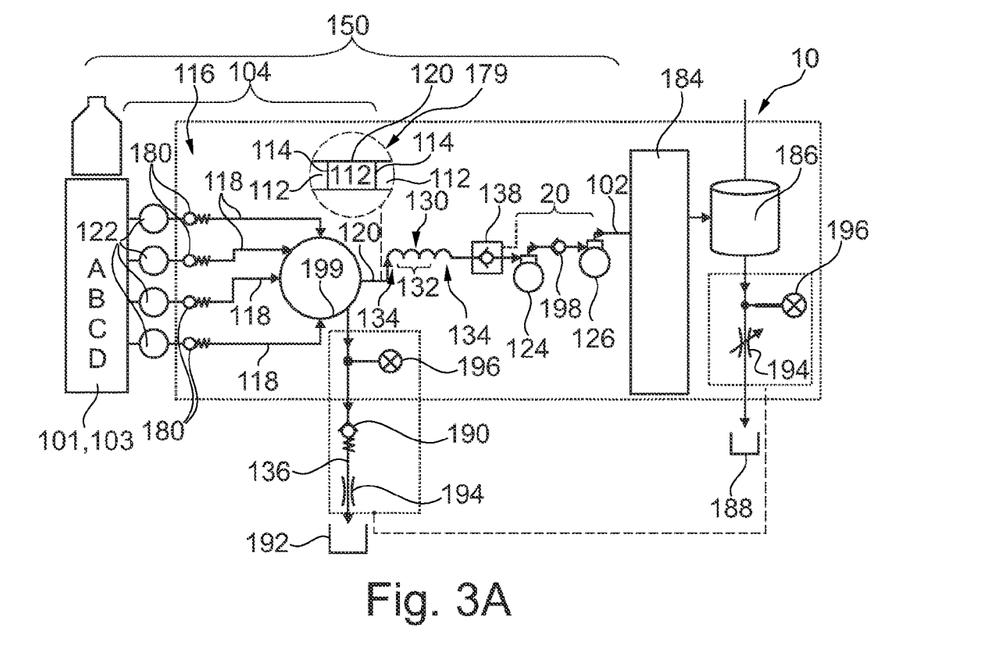
FIG. 3A illustrates a fluid supply system according to an exemplary embodiment of the invention.
Figure 3B:
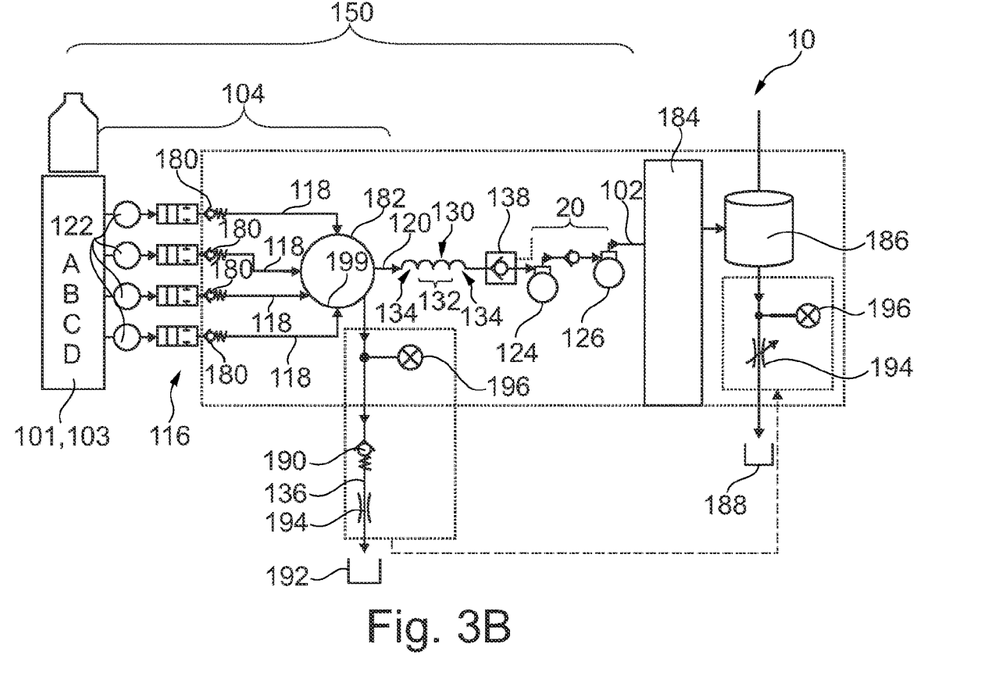
FIG. 3B illustrates a fluid supply system according to another exemplary embodiment of the invention.

To reduce the impact of gas in the solvent components or in the mobile phase, the system pressure may be kept above ambient pressure using the check valve 190 and a variable restriction (see reference numeral 194 in waste conduit 136 in FIG. 3A and FIG. 3B) at the inlet. To reduce or even minimize the impact of gas on the detector side, after the fluid drive unit 20, a second variable restriction (see reference numeral 194 downstream of fluid drive unit 20 in FIG. 3A and FIG. 3B) may be implemented. One or more pressure sensors (see reference numeral 196 in FIG. 3A and FIG. 3B) may make sure that the pressure at the pressure sensor 196 on the right-hand side of FIG. 3A and FIG. 3B is preferably always greater or equal to the pressure at the pressure sensor 196 on the left-hand side of FIG. 3A and FIG. 3B and always greater than ambient pressure. Hence, an air bubble cannot shift the solvent through the analyzation process and alter the result in such an embodiment.

Possible configurations for implementing the method described referring to FIG. 2 are illustrated in FIG. 3A and FIG. 3B. Hence, FIG. 3A and FIG. 3B illustrate fluid supply systems 150 according to exemplary embodiments of the invention.

Referring to FIG. 3A, a fluid supply system 150 for supplying a mobile phase in a sample separation device 10 for separating a fluidic sample in a separation path 102 is provided. The mobile phase is a solvent composition of multiple solvents or solvent components A, B, C and D. The sample separation device 10 may be a liquid chromatography apparatus.

The fluid supply system 150 comprises a proportioning unit 104 configured for proportioning the multiple solvent components A, B, C and D for composing the mobile phase. The proportioning unit 104 is configured for providing a serial sequence of fluid packets 112 each relating to a respective one of the solvent components A, B, C, D. A detail 179 shows a sequence of three fluid packets 112 in conduit 120, for instance a sequence A-B-A. In the shown embodiment, the proportioning unit 104 comprises a proportioning valve 116 being switchable by the control unit 70 (compare FIG. 1, not shown but present in each of FIG. 3A to FIG. 9) for providing a fluidic coupling between a respective one of four fluid supply conduits 118 each assigned to a respective one of the solvent components A, B, C, D on the one hand, and fluidic conduit 120 fluidically connecting the proportioning valve 116 with fluid drive unit 20 on the other hand. A respective optional pre-pump 122 is implemented in each of the four fluid supply conduits 118 for contributing to driving the respective solvent component A, B, C, D flowing in a respective one of the fluid supply conduits 118. A corresponding check valve 180 is arranged in each of the fluid supply conduits 118.

The already mentioned fluid drive unit 20 is configured for driving and compressing the solvent components A, B, C, D of the mobile phase, i.e. to bring them to a high-pressure of for example 1200 bar. As shown, the fluid drive unit 20 comprises a primary piston pump 124 for aspirating and compressing the solvent components A, B, C, D used for creating the mobile phase. The primary piston pump 124 is configured for cooperating, controlled by control unit 70, with a secondary piston pump 126 of fluid drive unit 20. The secondary piston pump 126 is arranged downstream of the primary piston pump 124. More specifically, the secondary piston pump 126 is in fluid communication with and cooperates with the primary piston pump 124. Descriptively speaking, the secondary piston pump 126 is configured for driving the compressed mobile phase into the separation path 102 downstream of the fluid drive unit 20. In the separation path 102, the fluidic sample is separated into fractions using the mobile phase as a carrier and release medium, as known by those skilled in the art of liquid chromatography. Preferably, the fluid drive unit 20 is configured for compressing the mobile phase up to a high-pressure for example 1200 bar.

The already mentioned control unit 70 is configured for controlling the proportioning unit 104 and the fluid drive unit 20 for providing a proper mobile phase with well-defined solvent composition. In particular, the control unit 70 may carry out the control so that one or more undefined spatial portions 110 (compare for instance FIG. 8 and FIG. 9) of the mobile phase may be removed from the mobile phase before delivering the mobile phase from the fluid drive unit 20 to the separation path 102. Thus, the remaining mobile phase being used in terms of the separation process has a well-defined and well-known composition. In particular, such an undefined portion 110 may correspond to an interface 114 between adjacent fluid packets 112 of different solvent components A, B, C, D, as shown in detail 179. At such an interface 114, effects such as diffusion and a Poisson velocity profile may result in a local uncertainty about the precise located composition of the mobile phase. Additionally or alternatively, an undefined portion 110 which may be removed from the rest of the mobile phase may correspond to an amount of mobile phase remaining in the primary piston pump 124 after having supplied another amount of mobile phase compressed by the primary piston pump 124 from the primary piston pump 124 to the secondary piston pump 126. Such residuals of mobile phase which have unintentionally not been transferred from the primary piston pump 124 to the secondary piston pump 126 may also lack a precise definition of the solvent composition and can therefore also be advantageously removed from the mobile phase before supplying the well-defined rest of the mobile phase to the separation path 102. The control unit 70 may control the primary piston pump 124 of the fluid drive unit 20 to move its piston 128 (see FIG. 4) in a forward direction (see downward arrow at piston 128 in FIG. 4) to thereby remove a respective undefined portion 110 to waste conduit 136. As shown, the waste conduit 136 may branch off from fluidic conduit 120 at a fluidic coupling point 199 between the proportioning unit 104 and the fluid drive unit 20. The waste conduit 136 may be configured for receiving one or more undefined portions 110 to be removed from the mobile phase.

Furthermore, a buffer unit 130 may be foreseen and may be embodied for example as a buffer loop with a predefined volume for temporarily accommodating an undefined portion 110 of mobile phase to be removed. The buffer unit 130 may include a central volume portion 132 between two peripheral volume portions 134. The central volume portion 132 may serve for completely accommodating the entire undefined portion 110, while mobile phase or a solvent component A, B, C, D of the mobile phase with defined properties may be accommodated in one or both of the peripheral volume portions 134. In the embodiment of FIG. 3A, the buffer unit 130 is located downstream of the proportioning unit 104 and upstream of the fluid drive unit 20.

Furthermore, an active valve 138 is located between the waste conduit 136 and the fluid drive unit 20 and is switchable by the control unit 70 for removing a respective undefined portion 110 from the mobile phase. Descriptively speaking, the active valve 138, when switched open, may enable a flow of the undefined portion 110 into the waste conduit 136. Correspondingly, a check valve 190 in the waste conduit 136 may be configured to open for removing the undefined portion 110 into the waste conduit 136 and from there into a waste container 192. Check valve 190 may be a passive valve switching into an open state in the presence of a certain overpressure, or may be an active valve switched by control unit 70.

A sample container 186 may be provided for accommodating analyzed fluidic sample flowing out of separation part 184 of the sample separation device 10. Advantageously, the analyzed fluidic sample in the sample container 186 may be kept pressurized above ambient pressure (for instance above 1 bar). This may help to reduce the influence of air (or other gas) bubbles by settable restrictions (see reference numerals 194).

Still referring to FIG. 3A, up to four different solvent components A, B, C, the in up to four different solvent containers (compare reference numerals 101 and 103 in FIG. 1) are guided via the pre-pumps 122 and check valves 180 towards an annular fluidic member 182 (numbered in FIG. 3B) and from there through buffer unit 130. Via the check valve 138, the mobile phase may then be guided through primary piston pump 124 and secondary piston pump 126 of fluid drive unit 20. As indicated schematically in FIG. 3A, the mobile phase may then be pumped towards the actual separation part 184 of the sample separation device 10 where a liquid chromatography separation is carried out (shown in more detail in FIG. 1). Separated fluidic sample may flow out of the separation part 184 and into sample container 186. The separated fluidic sample including mobile phase may then be forwarded to a final storage container 188 which may be for instance at ambient pressure.

As shown in FIG. 3A as well, annular fluidic member 182 is also connected to the waste conduit 136. Check valve 190 may determine whether a fluid may flow from annular fluidic member 182 into the waste conduit 136 and further into waste container 192.

Furthermore, fluidic restrictions are indicated schematically with reference numeral 194 and pressure gauges are indicated schematically with reference numerals 196 in FIG. 3A.

The individual fluid packets 112 provided by the proportioning unit 104 are combined or unified at an interface between annular fluidic member 182 and fluidic conduit 120. Thus, the combination of the fluid packets 112 occurs on the low pressure side, i.e. upstream of the fluid drive unit 20. The primary piston pump 124 aspirates the solvent components A, B, C, D provided by the proportioning unit 104. Thus, during sucking or aspirating the solvent components A, B, C, D by the primary piston pump 124, its piston moves backwardly and therefore sucks or draws a solvent composition defined by the proportioning unit 104. The secondary piston pump 126 conveys the pressurized mobile phase into the separation path 102, i.e. into separation part 184.

In a deliver and fill phase, the piston of the primary piston pump 124 moves backwardly and simultaneously the piston of the secondary piston pump 126 moves forwardly so as to transfer the compressed mobile phase from the primary piston pump 124 to the secondary piston pump 126 without a change of the flow rate of the mobile phase. Mobile phase remaining in the piston chamber of the primary piston pump 124 after the mentioned deliver and fill phase is of undefined composition. In order to get rid of such an undefined portion 110 of the mobile phase, the remaining mobile phase in the piston chamber of the primary piston pump 124 may be decompressed by moving the piston of the primary piston pump 124 again backwardly. Thereafter, the piston of the primary piston pump 124 moves forwardly to eject the undefined portion 110 towards the waste conduit 136 and away from the remaining defined portion of the mobile phase being delivered towards the separation path 102. The undefined portion 110 is ejected through the waste conduit 136 by correspondingly controlling the active valve 138 to be open. The passive check valve 190 in the waste conduit 136 opens automatically under the pressure generated by the forward motion of the piston of the primary piston pump 124, whereas a (passive or active) check valve 198 between the primary piston pump 124 and the secondary piston pump 126 remains closed. The corresponding operation is controlled by control unit 70, shown in FIG. 1, but not shown in FIG. 3A and the subsequent figures.

The buffer unit 130 is used for error equilibration or, in other words, for removing the undefined portion 110 from the mobile phase. This can be accomplished by an additional forward motion phase of the piston of the primary piston pump 124 after deliver and fill and before a subsequent aspirating phase.

As already described above, a further uncertainty in the solvent composition of the mobile phase is due to the fact that, as a result of switching the proportional valve 116 between the different solvent composition channels, an undefined portion 110 of mobile phase may also be formed at an interface 114 between subsequent fluid packets 112 of different solvent components A, B, C, D. Such an undefined portion 110 may be aspirated until it is located in an interior of the buffer unit 130, more precisely is located in the central volume portion 132 thereof. Subsequently, the piston of the primary piston pump 124 is temporarily moved again forwardly so that the undefined portion 110 of the mobile phase in the central volume portion 132 of the buffer unit 130 is ejected into the waste line 136. A transition portion (corresponding to fluid interface 114) between subsequent fluid packets 112 may be undefined for two reasons: Firstly, diffusion may occur between adjacent fluid packets 112 in an unpredictable way. Secondly, a Poisson profile may be established in fluid flowing in conduits (such as fluidic conduit 120). A Poisson profile may be denoted as a substantially parabolic velocity profile over the cross-section of the fluid conduits such as fluid conduit 120. Dimensioning of the buffer unit 130 and/or control of the fluid supply system 150 to get rid of a correspondingly undefined portion 110 of mobile phase may be carried out correspondingly.

Referring to FIG. 3B, a fluid supply system 150 according to another exemplary embodiment of the invention with more active valves than in FIG. 3A is shown.

Figure 4:
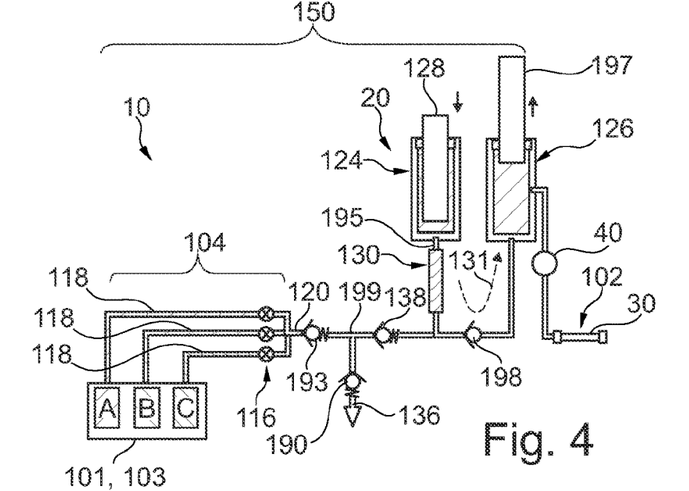
FIG. 4 illustrates a fluid supply system according to an exemplary embodiment of the invention in a certain operation mode during removing an undefined portion of mobile phase after transferring mobile phase from a primary piston pump to a secondary piston pump of a fluid drive unit.
Figure 5:
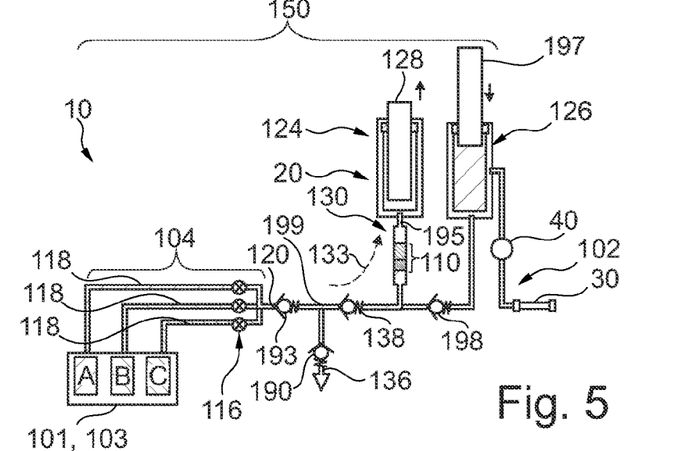
FIG. 5 illustrates the fluid supply system illustrated in FIG. 4 in a different operation mode.
Figure 6:
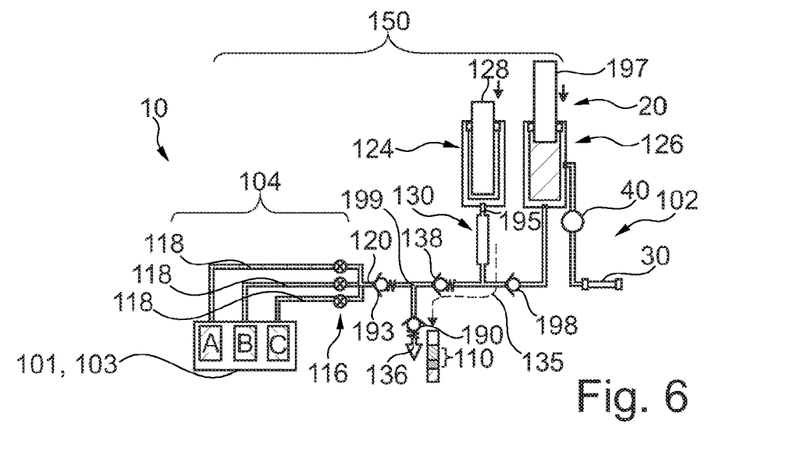
FIG. 6 illustrates the fluid supply system illustrated in FIG. 4 in another, different operation mode.

FIG. 4 to FIG. 6 illustrate a fluid supply system 150 according to an exemplary embodiment of the invention in different operation modes during removing an undefined portion 110 of mobile phase after transferring mobile phase from a primary piston pump 124 to a secondary piston pump 126 of fluid drive unit 20.

According to this embodiment, three solvent components A, B and C are combined and mixed for forming mobile phase. In FIG. 4 to FIG. 6, the present motion direction of a first piston 128 of the primary piston pump 124 and a second piston 197 of the secondary piston pump 126 are indicated by corresponding arrows. According to the FIG. 4 to FIG. 6, the buffer unit 130 is located downstream of primary piston pump 124 and upstream of secondary piston pump 126 in a mobile phase transition path from primary piston pump 124 to secondary piston pump 126.

Referring to FIG. 4, an end of a defill phase is illustrated. Thus, the primary cylinder of primary piston pump 124 has transferred its compressed volume of solvent composition or mobile phase into the secondary cylinder of secondary piston pump 126, as indicated by arrow 131, and is at a target position to start drawing new solvent. However, a certain amount of solvent composition or mobile phase under high pressure may be still in the piston chamber of the primary piston pump 124 and in a transfer line 195 adjacent to the primary piston pump 124. The transfer line 195 may be filled with solvent having the composition of the just finished cycle. A certain transfer volume $V_T$ may be assigned to the transfer line 195 or to buffer unit 130. During a subsequent ejection of an undefined portion 110 of mobile phase without clearly defined solvent composition into waste conduit 136, an increased pressure may act on check valve 190 in waste conduit 136. A reduced pressure may present at a further check valve 193 between fluidic coupling point 199 and proportioning valve(s) 116 while drawing from the solvent containers 101, 103.

Referring to FIG. 5, the fluid supply system 150 prepares a refill phase. The piston 128 of the primary piston pump 124 decompresses solvent in its assigned cylinder and the transfer line 195. The active inlet valve 138 opens actively or actively supported. Alternatively, valve 138 may also be configured as a passive valve. The primary piston pump 124 then draws a certain (but not exactly known) amount of the solvent from the transfer line 195 into its cylinder, and (in particular simultaneously) solvent component A into the transfer line 195 (see arrow 133). During this time, the secondary piston pump 126 is fluidically decoupled from the primary piston pump 124 (by the check valve 198) and continues to deliver into the system, i.e. to separation path 102.

Referring to FIG. 6, a clean-up phase of the sample supply system 150 is shown.

According to FIG. 6, the primary piston pump 124 stops drawing and ejects part or all of the transfer volume, preferably returning to its target position. The transfer volume or buffer unit 130, which previously contained the solvent plugs or solvent packets of unknown volume and/or unknown composition may be replaced by solvent having the composition of the previous cycle.

At the end of the shown clean up phase, the primary piston 128 of the primary piston pump 124 may be at a defined starting position, and the primary cylinder of the primary piston pump 124 and the transfer line 195 are filled with solvent of the actual composition. Furthermore, the primary cylinder of the primary piston pump 124 and the transfer line 195 may be at a common pressure. Solvent component A is drawn up to an eject point. The undefined portion 110 may be ejected to the waste line 136, see arrow 135.

Figure 7:
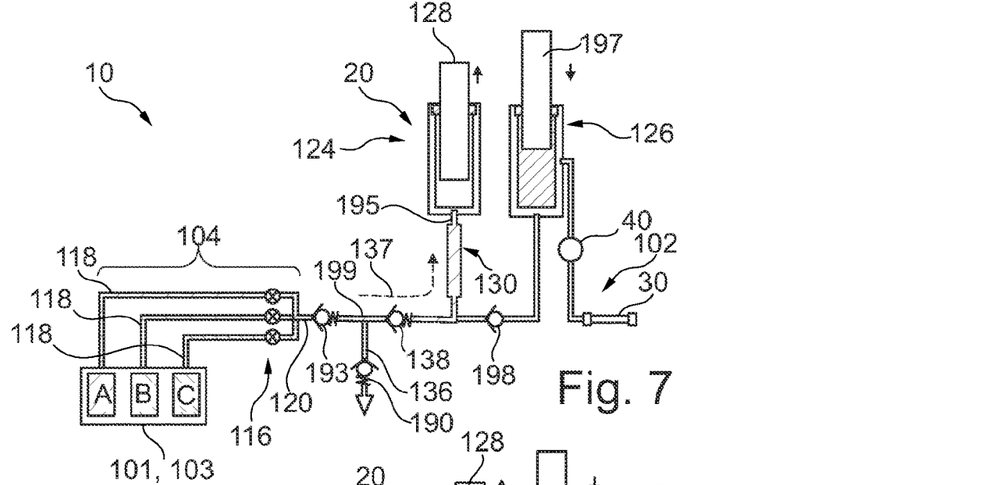
FIG. 7 illustrates the fluid supply system according to FIG. 4 to FIG. 6 in a certain operation mode during removing an undefined portion of mobile phase after drawing solvent.
Figure 8:
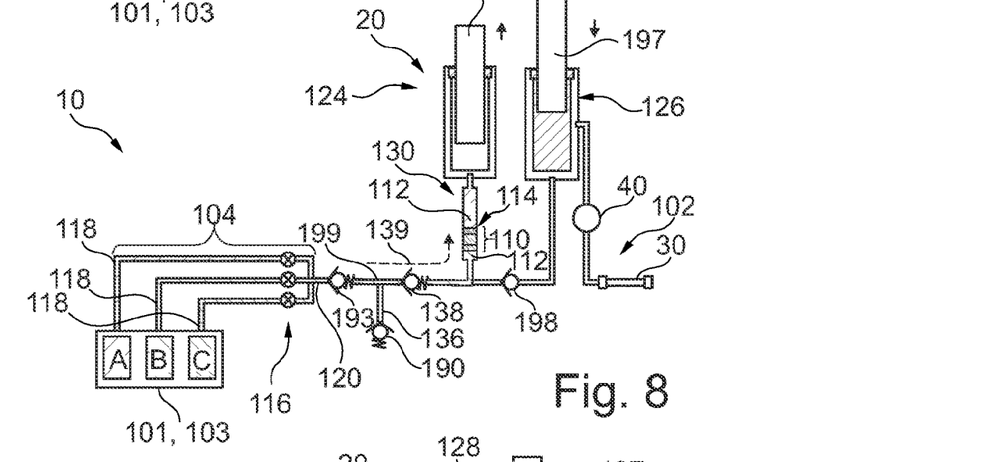
FIG. 8 illustrates the fluid supply system according to FIG. 4 to FIG. 6 in a different operation mode.
Figure 9:
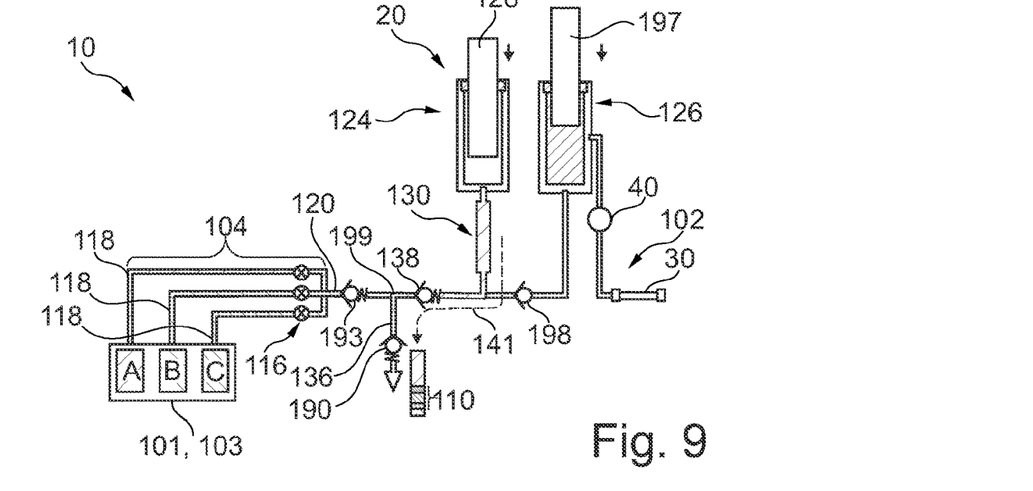
FIG. 9 illustrates the fluid supply system according to FIG. 4 to FIG. 6 in another, different operation mode.

FIG. 7 to FIG. 9 illustrate the fluid supply system 150 according to FIG. 4 to FIG. 6 in different operation modes during removing an undefined portion 110 of mobile phase after drawing solvent.

Referring to FIG. 7, a draw solvent phase is shown. The primary piston 128 draws a desired volume portion of solvent component A into transfer line 195 and primary cylinder of primary piston pump 124. This is indicated by an arrow 137.

Referring to FIG. 8, a change solvent phase is shown. The primary piston 128 draws a certain volume $V_{SA}$ from the solvent container containing solvent component A and draws a certain volume $V_{SB}$ from the solvent container containing solvent component B. This is indicated by an arrow 139. For example, the following equations are fulfilled during this operation:

$$V_{SA}=0.3*V_T$$

$$V_{SB}=0.1*V_T$$

For example, the uncertainty may be from valve switching times, solvent plug mixing behaviour (such as channel geometries, solvent viscosities, etc.). At the end of this phase, the primary cylinder of the primary piston pump 124 has drawn an additional volume of solvent component A and a not precisely known volume of solvent component A plus solvent component B and a not precisely known volume of solvent component B. The uncertainty or undefined portion 110 is located within the transfer volume or buffer unit 130.

Referring to FIG. 9, a clean-up phase is carried out. The primary piston 128 stops drawing and ejects a volume of $V_{SA}+V_{SB}$ from the primary cylinder of the primary piston pump 124 into and through the transfer volume or buffer unit 130 into the waste conduit 136. This is indicated by an arrow 141.

At the end of this clean up phase, the primary piston 128 is at the end of the previous draw position (for example solvent component A), and solvent component B is drawn up to the eject point.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

The invention claimed is:

1. A fluid supply system for supplying a mobile phase in a sample separation device for separating a fluidic sample in a separation path, the fluid supply system comprising:
    a proportioning unit configured to proportion multiple solvent components for composing the mobile phase and for providing a serial sequence of fluid packets each relating to a respective one of the solvent components;
    a fluid drive unit configured to drive the mobile phase toward the separation path; and
    a control unit configured to control the proportioning unit and the fluid drive unit so that an undefined portion of the mobile phase is removed from the mobile phase before delivering the mobile phase from the fluid drive unit to the separation path.

2. The fluid supply system according to claim 1, wherein the removed undefined portion corresponds to a fluid interface between adjacent fluid packets of different solvent components.

3. The fluid supply system according to claim 1, wherein the proportioning unit comprises at least one proportioning valve being switchable by the control unit for providing a fluidic coupling between a respective one of a plurality of fluid supply conduits, each assigned to a respective one of the solvent components, and a fluidic conduit fluidically connecting the proportioning valve with the fluid drive unit.

4. The fluid supply system according to claim 3, comprising a pre-pump in at least one of the plurality of fluid supply conduits for pumping a respective one of the solvent components to the proportioning valve.

5. The fluid supply system according to claim 1, wherein the fluid drive unit comprises a primary piston pump for aspirating and compressing the solvent components of the mobile phase and a secondary piston pump downstream of and cooperating with the primary piston pump and being configured for driving the compressed mobile phase into the separation path.

6. The fluid supply system according to claim 5, wherein the removed undefined portion corresponds to a portion of mobile phase remaining in the primary piston pump after having supplied another portion of mobile phase, compressed by the primary piston pump, from the primary piston pump to the secondary piston pump.

7. The fluid supply system according to claim 1, wherein the control unit is configured for controlling a primary piston pump of the fluid drive unit for moving its piston to thereby remove the undefined portion.

8. The fluid supply system according to claim 1,
    comprising a buffer unit with a predefined volume configured for temporarily accommodating the undefined portion;
    wherein the control unit is configured for controlling the proportioning unit and the fluid drive unit so that the undefined portion is temporarily completely accommodated in the buffer unit before being removed.

9. The fluid supply system according to claim 8, wherein the buffer unit is located downstream of the proportioning unit and upstream of the fluid drive unit.

10. The fluid supply system according to claim 8, wherein the buffer unit is located in a flow path between a primary piston pump of the fluid drive unit and a secondary piston pump of the fluid drive unit located downstream of the primary piston pump.

11. The fluid supply system according to claim 1, comprising a buffer unit with a predefined volume including a central volume portion between two peripheral volume portions and being configured for accommodating the undefined portion in the central volume portion while accommodating mobile phase or a solvent component of the mobile phase with defined properties in at least one of the peripheral volume portions.

12. The fluid supply system according to claim 1,
    comprising a waste conduit branching off from a fluidic conduit between the proportioning unit and the fluid drive unit;
    wherein the control unit is configured for controlling the proportioning unit and the fluid drive unit so that the undefined portion is removed from the mobile phase into the waste conduit.

13. The fluid supply system according to claim 12, comprising an active valve between the waste conduit and the fluid drive unit and being switchable by the control unit for removing the undefined portion from the mobile phase towards the waste conduit.

14. The fluid supply system according to claim 12, comprising a check valve in the waste conduit configured to open for removing the undefined portion into the waste conduit.

15. The fluid supply system according to claim 1, wherein the fluid drive unit is configured for compressing the mobile phase up to a pressure selected from the group consisting of: at least 500 bar; at least 1200 bar; and at least 1500 bar.

16. A sample separation device for separating a fluidic sample in a separation path, the sample separation device comprising:
the fluid supply system according to claim 1 for supplying mobile phase and for driving the mobile phase and the fluidic sample injected in the mobile phase along the separation path; and
a sample separation unit configured for separating the fluidic sample in the mobile phase.

17. The sample separation device according to claim 16, further comprising at least one of the following features:
the sample separation device is configured as a device selected from the group consisting of: a chromatography sample separation device; a liquid chromatography sample separation device; and a supercritical fluid chromatography sample separation device;
the sample separation device comprises a detector configured for detecting separated fractions of the fluidic sample;
the sample separation device comprises a fractionating unit configured for collecting separated fractions of the fluidic sample;
the sample separation device comprises a degassing apparatus for degassing the mobile phase.

18. A method of supplying a mobile phase in a sample separation device for separating a fluidic sample in a separation path, the method comprising:
proportioning multiple solvent components for composing the mobile phase;
providing a serial sequence of fluid packets each relating to a respective one of the solvent components;
driving the mobile phase towards the separation path; and
controlling the proportioning and the driving so that an undefined portion of the mobile phase is removed from the mobile phase before injecting the fluidic sample in the mobile phase for separation in the separation path.

19. The method according to claim 18, wherein the removed undefined portion corresponds to a fluid interface between adjacent fluid packets of different solvent components of the mobile phase and/or corresponds to a portion of mobile phase which has been compressed but not delivered towards the separation path.

20. A fluid supply system for supplying a mobile phase in a sample separation device for separating a fluidic sample in a separation path, the fluid supply system comprising:
a proportioning unit configured to proportion multiple solvent components for composing the mobile phase;
a fluid drive unit configured to drive the mobile phase toward the separation path;
a control unit configured to control the proportioning unit and the fluid drive unit so that an undefined portion of the mobile phase is removed from the mobile phase before delivering the mobile phase from the fluid drive unit to the separation path; and
a buffer unit with a predefined volume including a central volume portion between two peripheral volume portions and being configured for accommodating the undefined portion in the central volume portion while accommodating mobile phase or a solvent component of the mobile phase with defined properties in at least one of the peripheral volume portions.

* * * * *